May 20, 1941.  E. W. W. KEENE  2,242,861
ROTARY FILTER
Filed Oct. 10, 1939  6 Sheets-Sheet 1
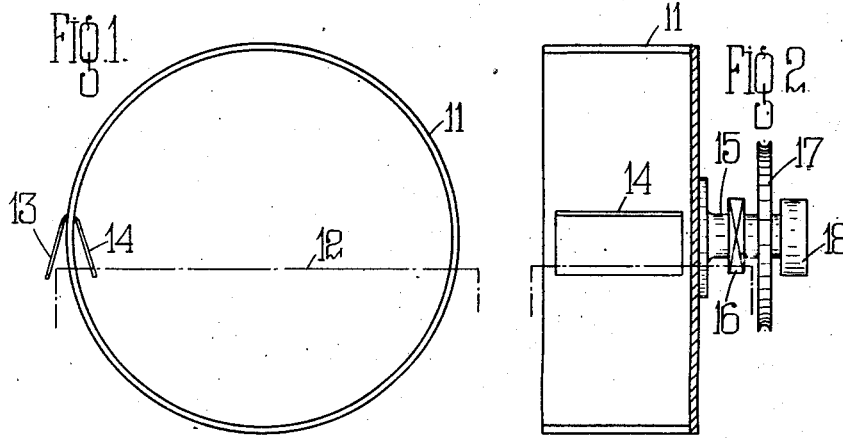
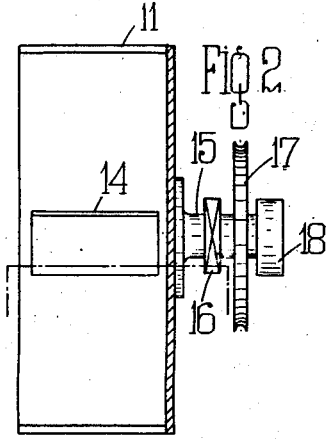
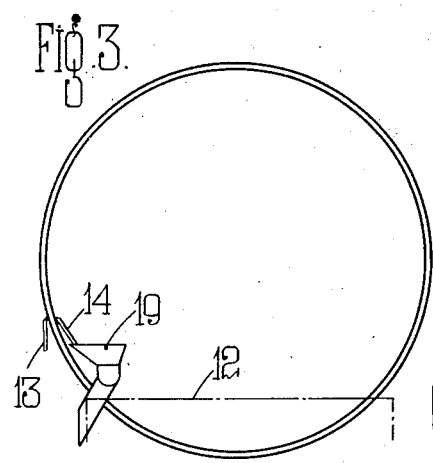
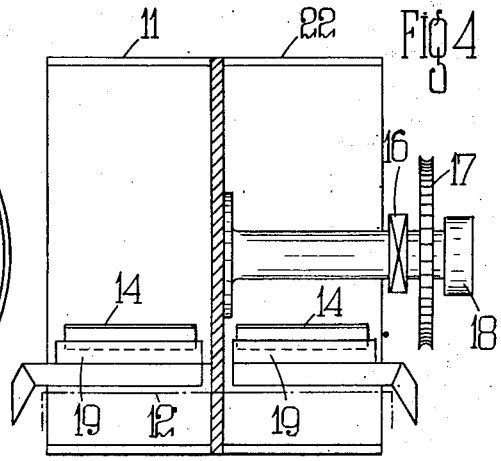
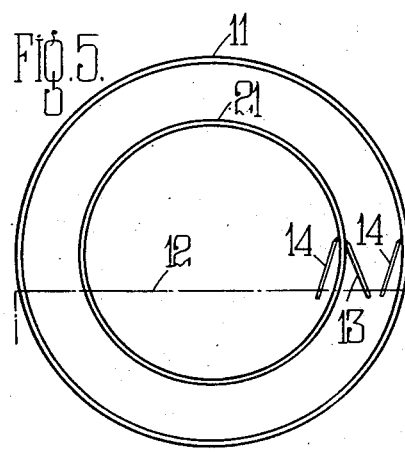
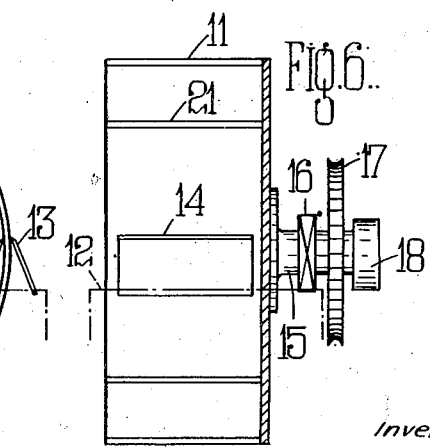
Inventor
Edward W. W. Keene
by Mason & Porter
Attorneys

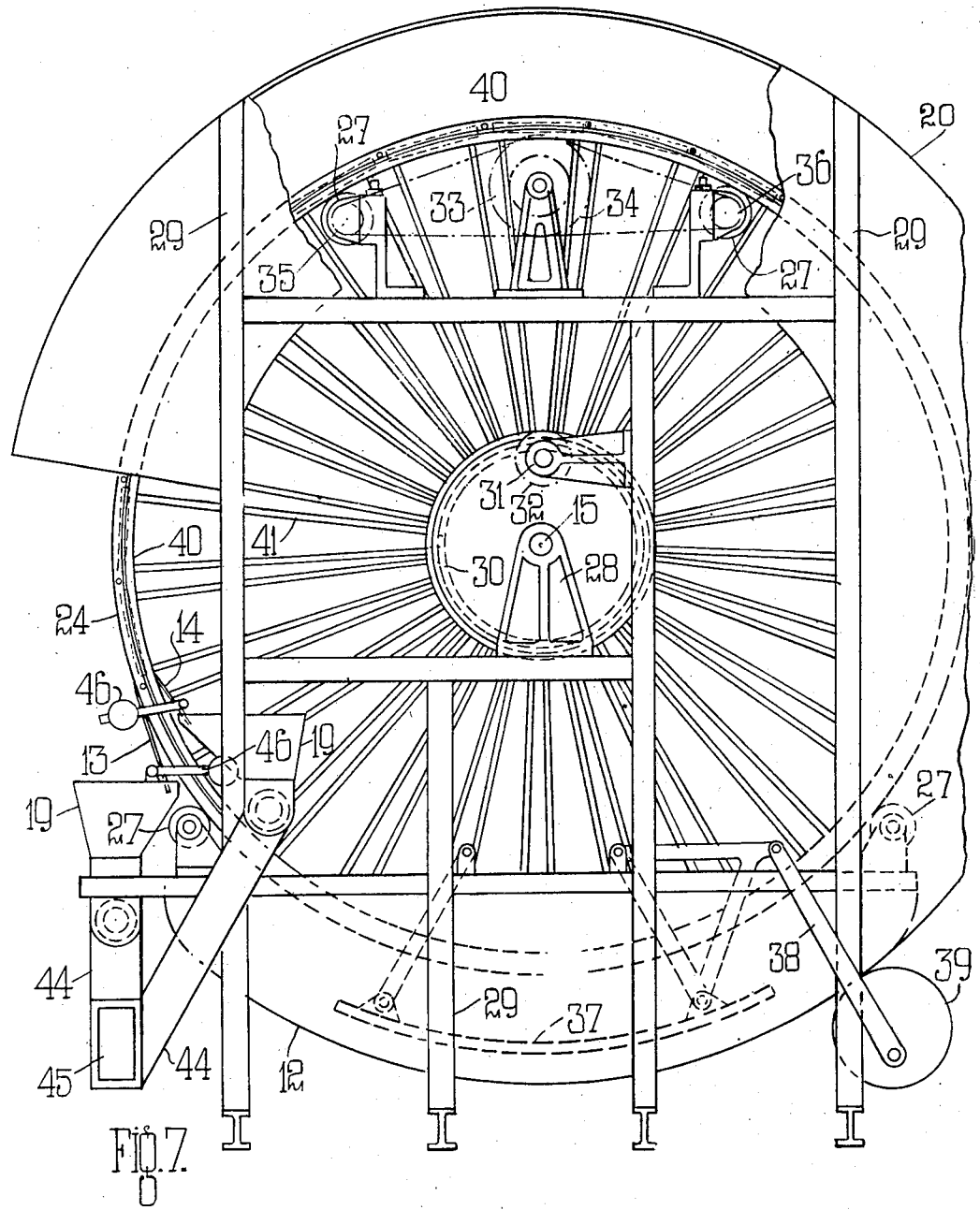

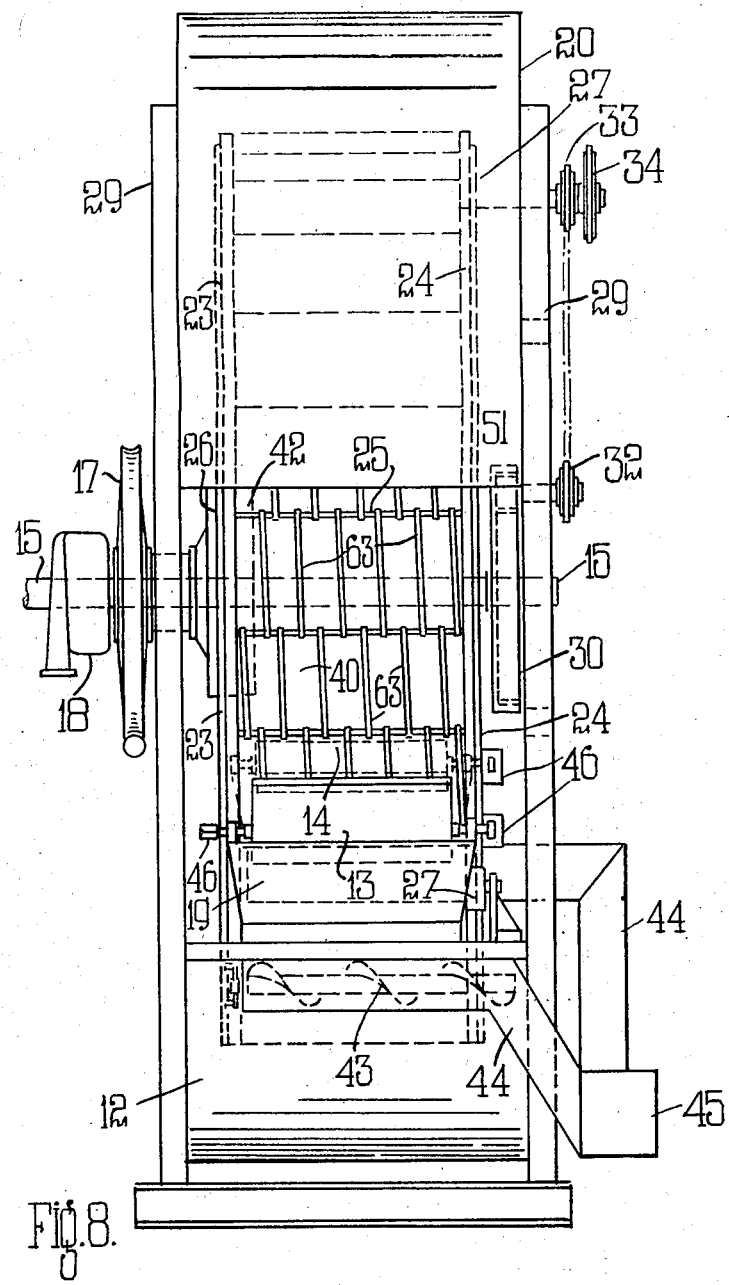

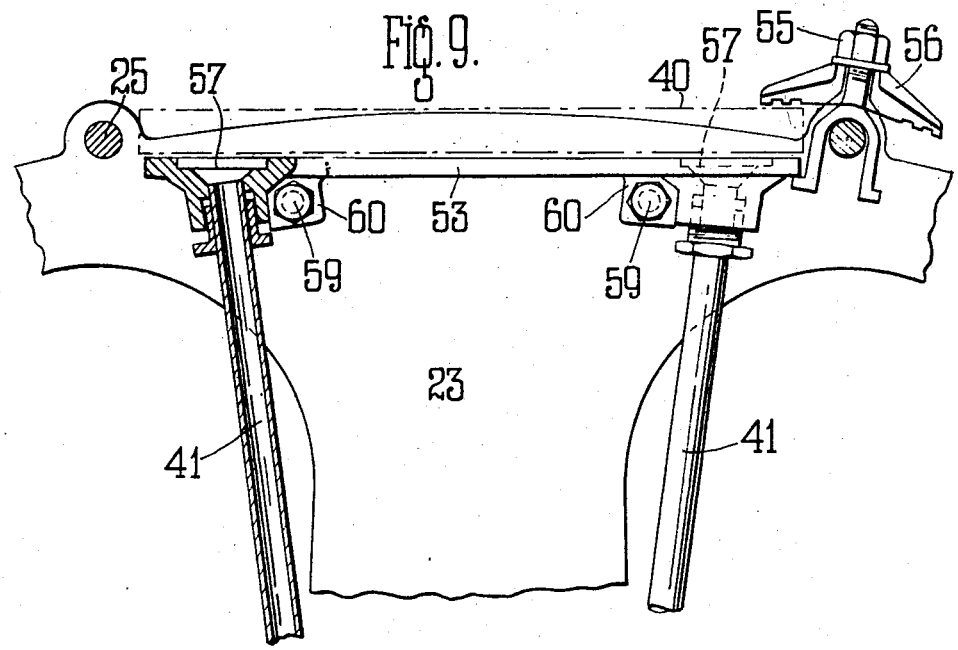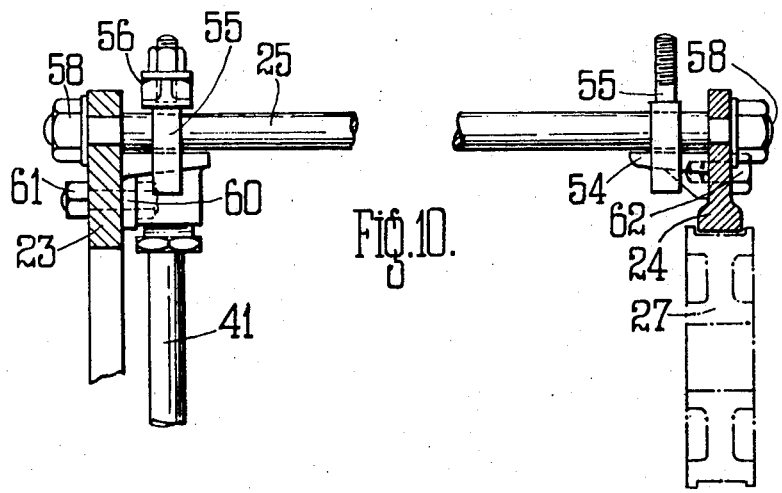

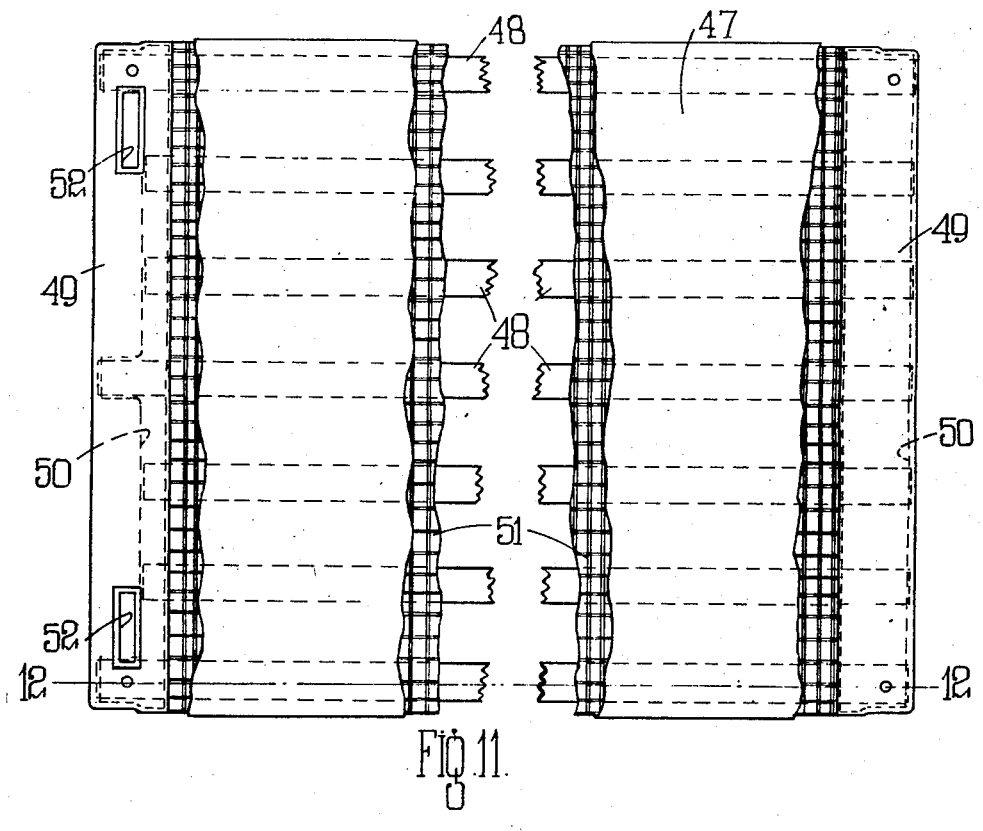
Fig. 11.
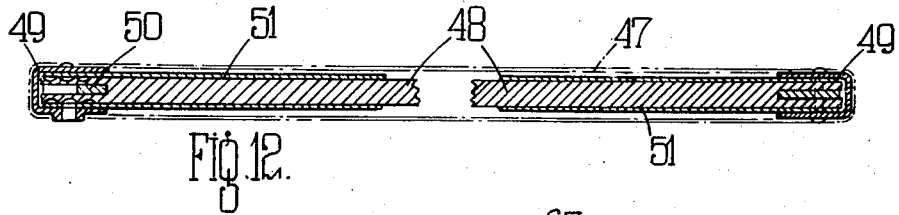
Fig. 12.
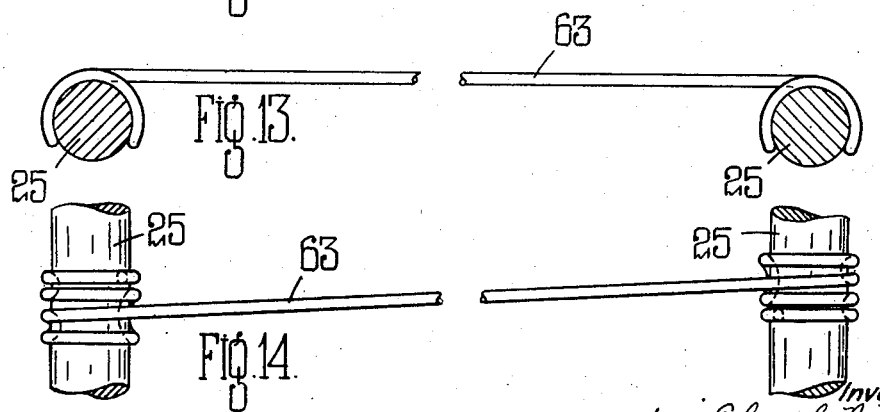
Fig. 13.
Fig. 14.

Patented May 20, 1941

2,242,861

UNITED STATES PATENT OFFICE 2,242,861

ROTARY FILTER

Edward Walter Wolfe Keene, Kingston-upon-Hull, England

Application October 10, 1939, Serial No. 298,828
In Great Britain September 24, 1938

9 Claims. (Cl. 210—201)

The present invention relates to filters, and has particular reference to the rotary drum type of filter wherein a drum carrying the filter media rotates within a tank containing the liquor from which the solid matter is to be separated.

In the known form of rotary drum filter, the drum consists of a cylindrical shell on the periphery of which is formed an annular compartment by the superposition of a filter cloth or other filtering medium. The cloth virtually is in the form of an endless band which is supported annularly of the drum shell by suitable means and the annular chamber so formed, in some cases, is divided into a number of smaller compartments. The filtered liquor thus passes through the cloth into the compartment or compartments to be conveyed away through cored end plates of the drum or through cored radial arms or tubes supporting the shell upon the centrally disposed shaft trunnioned on the sides of the tank, the solid matter being precipitated upon the external face of the filter medium and being allowed to "build-up" in the form of a cake. The cake is recoverable from the filter cloth by the action of scrapers or by washing means.

It will be appreciated that the effective filtering area is that of the peripheral face of the drum, and that for the filter apparatus to be efficient it is necessary that the size of the drum, both in regard to its diameter and width, should be considerable. It will be appreciated, of course, that, whilst in the filtration of certain liquors having suspended solid matter the area of the filter medium available is important, the factors of time and speed of rotation of the drum also govern the efficiency of the filtration process.

Again, where the ejection of the cake from the filter cloth is assisted by the application of a pressure applied to the interior of the compartments, the cloth may be disturbed from its position on the shell, despite the fact that it may be spirally wound with wire or the like binding means.

The object of the present invention is to provide a filter which will have the maximum area available for effective filtration of the liquor and "building-up" of the cake, and which will obviate the disadvantages associated with the known types of filters in regard to the filter cloth, whilst for a given diameter of the drum the filter of the present invention will provide a filtering area of approximately twice that in the known filters or, conversely, for a given filtering area will permit of a smaller diameter and/or width of drum being used. The filter of the present invention thus has the additional advantage of being more readily transportable than a known filter of similar capacity but of larger size.

According to the present invention, the filtering area of a rotary filter is comprised by the inner and outer faces of a rotor in the form of an open-ended drum.

The rotor is substantially cylindrical in form and the cylindrical wall is composed of a series of rectangular filtering media or "leaves" arranged with their rectangular faces subtense of the axis of the rotor, whereby the filtering area of the rotor is the aggregation of the areas of the said leaves.

The invention is more particularly described with reference to the accompanying drawings, in which:

Figures 1 and 2 illustrate diagrammatically one method of carrying the present invention into effect.

Figures 3 and 4 diagrammatically illustrate a modified method, and Figures 5 and 6 show a third embodiment of the present invention.

Figure 7 is a side elevation of one form of construction of filtering apparatus according to the present invention.

Figure 8 is an end view of Figure 7.

Figure 9 is a fragmentary sectional elevation of a portion of the rotor shown in Figures 7 and 8.

Figure 10 is a sectional end view corresponding to Figure 9.

Figure 11 is a plan view of one of the filter leaves with which the rotor is provided, portions of the filter cloth being removed to show more clearly the structure of the leaf.

Figure 12 is a sectional elevation on the line 12—12 of Figure 11.

Figures 13 and 14 are details of wire clips serving for wiring the cloth of a single filter leaf.

Figure 15:
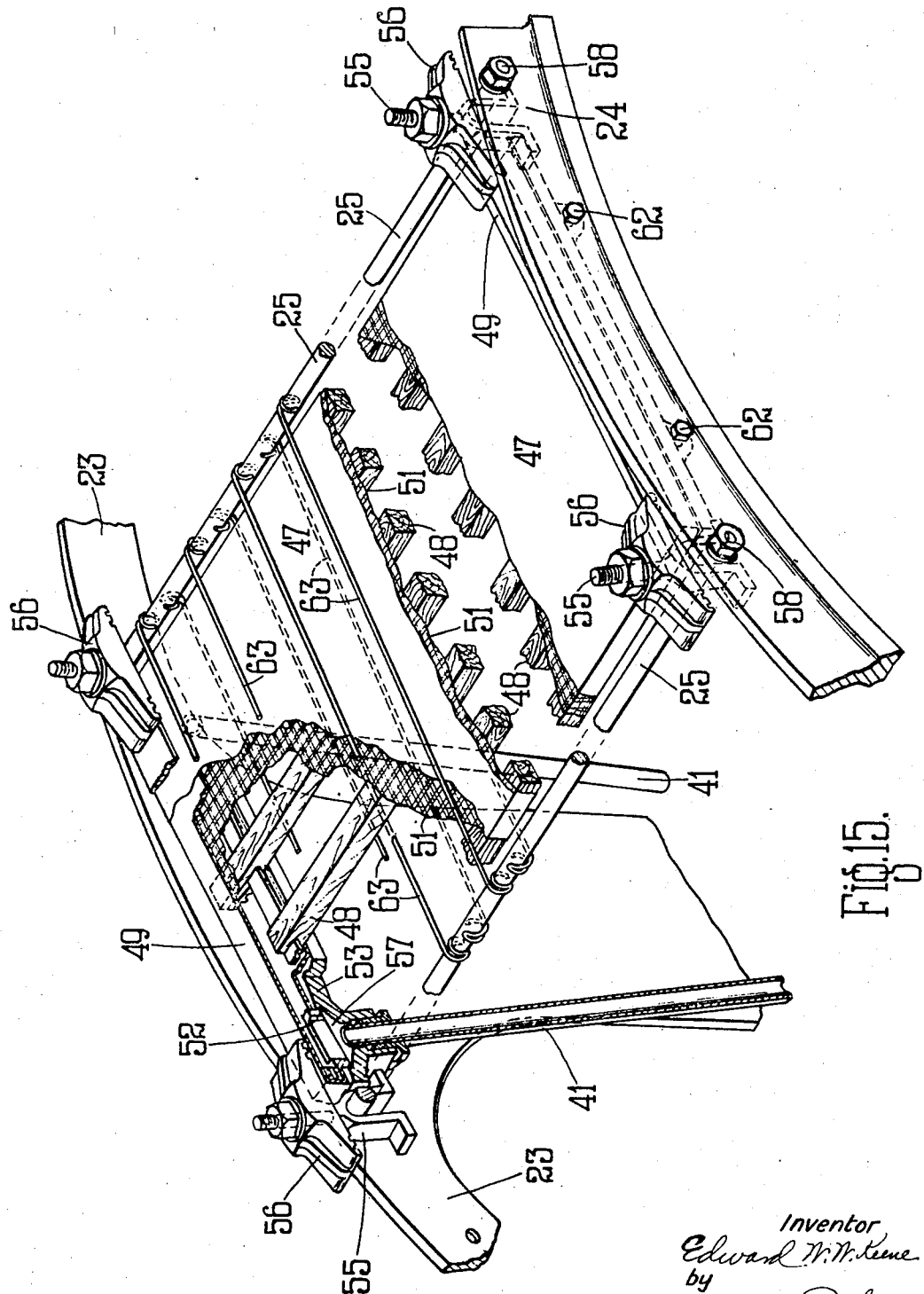
Figure 15 is a perspective view of a portion of the rotor to show the disposition thereon of a single filter leaf and to illustrate, in section, the structure of the leaf and the drainage passages therefrom.

In the application of the present invention diagrammatically illustrated in Figures 1 and 2 of the drawings, a rotor 11 rotates in a tank of normal level, as indicated by the chain-dotted lines at 12. The filtering area of the rotor 11 is composed both by the inner and the outer faces of filter leaves chordally disposed around the periphery of the rotor and, accordingly, a scraper 13 is adapted to remove the precipitate from the outer face of the rotor 11 whilst a scraper 14 is adapted to remove the precipitate from the inner face of said rotor. The rotor 11 is in the form of an open-ended drum supported upon a shaft 15 and rotatable in a bearing 16 by means of the worm wheel 17, said shaft 15 being formed hollow to accommodate the drainage pipes or passages (not shown in the diagrammatic illustrations of the invention) from the filter leaves, and having a valve 18 for controlling the discharge of the filtered liquor from the apparatus.

In the modification of the invention illustrated in Figs. 3 and 4, a pair of open-ended rotors 11 and 22 of similar diameters are supported upon a common web to extend axially in opposite directions, the rotors rotating in a tank of low level which is indicated by the chain-dotted lines at 12. In Figure 3, the drum is immersed to an arcuate extent of approximately 90°. Each rotor 11 and 22 has an exterior scraper 13 and an interior scraper 14 for removal of the precipitate therefrom, a hopper 19, for each interior scraper being provided for the reception of the precipitate and for conveying this away. The common web of the rotors 11 and 22 is supported by the hollow shaft 15 rotating in the bearing 16 by means of the worm wheel 17 and, in this case, the valve 18 controls the discharge of the filtered liquor from both the rotors 11 and 22.

In the diagrammatic representation of the invention illustrated in Figures 5 and 6, a pair of rotors 11 and 21 of different diameters are concentrically arranged upon a common web, said rotors rotating in a tank the level of which is indicated in chain-dotted lines at 12. Each rotor 11, 21 is provided with an exterior scraper 13 and an interior scraper 14, the precipitate thus removed falling into troughs (not shown). As will be readily appreciated, the scraper 13 of the rotor 21 and the scraper 14 of the rotor 11 may have a common trough. The common web of the rotors 11, 21 is supported upon a shaft 15 rotatable in the bearing 16 by means of the worm wheel 17, whilst the valve 18 controls the discharge of the filtered liquor from both rotors 11, 21.

Referring now to Figures 7 and 8 which illustrate in elevation and end view, respectively, the embodiment of the present invention in a filter having a tank of relatively low height, the filter casing is shown at 20 and is broken away to permit the construction being readily understood. In the construction illustrated, the rotor is in the form of an open ended drum constituted by a pair of coaxially arranged hoops 23, 24 longitudinally spaced apart by means of distance pieces in the form of bars 25. The hoop 23 constitutes the rim of a wheel or web having arms extending from a flange 26 formed on the centrally disposed shaft 15, whilst the other hoop 24 is supported by rollers 27 to maintain true concentric relationship with the hoop 23.

The shaft 15 is trunnioned in a bearing supported on a pedestal (not shown) and is extended axially of the rotor to be further supported in a bearing 28 carried by a member of the frame 29 of the apparatus.

The rollers 27 engaging the inner periphery of the hoop 24 assist in driving the rotor in that they themselves are driven from an internally toothed ring 30 securely mounted on the shaft 15, through the medium of a pinion 31 and chain driven sprocket wheels 32, 33, 34, 35, 36.

The rotor is continuously driven at a relatively slow speed by means of the worm gearing 17, and during each complete rotation each part of the rotor passes into, through, and out of the tank 12 containing the liquor to be filtered and to which, in some cases, a filtering aid has been added to assist in the filtering operation. The tank 12 is supported by the frame 29 of the apparatus, and is provided with an agitating mechanism 37 adapted to be operated by means of a link 38 from a crank 39 driven from the shaft 15.

The filtering area of the rotor is constituted by the aggregation of the areas of a series of rectangular filter leaves 40 arranged in chordal disposition around the periphery of the rotor, each filter leaf 40 having hydraulic communication with two of a number of drainage pipes 41 extending from a hollow boss 42 of the shaft 15, said hollow boss 42 being in hydraulic communication with the valve 18 controlling the supply of filtered liquor from the apparatus.

As is common practice, the valve 18 houses relatively rotating ported members whereby a single revolution of the rotor has three phases, firstly that of a suction or vacuum, applied to the leaves 40 through the pipes 41, while the leaves are angularly displaced through the liquor; secondly, a period when the vacuum is broken and, thirdly, a pressure applied through the pipes 41 to the leaves 40 to assist in ejection of the cake precipitated on the leaves and to assist in the scraping of the precipitated cake from said leaves 40.

Thus, for a single revolution of the rotor, each leaf 40 has a suction applied to it during its passage through the tank 12, the filtered liquor passing through the leaf and through the drainage pipes 41 in communication with said leaf and so to the valve 15, whilst the solid matter is precipitated upon the rectangular faces of the filter leaf 40 in the form of a cake and "builds up" on both the inner and outer faces of the rotor comprised by the rectangular faces of the filter leaves 40. Subsequent to their displacement through the tank 12, the leaves 40 are subjected to a washing action by means of spray pipes disposed transversely of the rotor periphery, whereby washing of both the inner and outer faces of the leaves is effected simultaneously, to assist the passage of the liquor through the filtering media, the excess wash water being permitted to drain back into the tank 12.

Each of the pair of scrapers 13, 14, provided respectively for removing the cake precipitated on the outer and inner faces of the filtering area, is supported by a trough or hopper 19, the scraper 13 extending transversely of the outer peripheral face of the rotor, and the scraper 14 extending across the internal peripheral face of said rotor interiorly of the rotor.

Each trough or hopper 19 is provided with a worm screw conveyor 43 for conveying the precipitated cake, removed from the rotor, to a chute 44, said chutes having a common exit orifice 45. Uniform pressure of each scraper 13, 14 is maintained upon the filtering area by means of a balance weight 46 acting about the fulcrum of the filter leaf, whilst each leaf may be adjustably supported in its pivotal position by means of an adjustable screw 46a.

Referring to Figures 9 and 10 of the drawings, each filter leaf structure 40, is arranged between the hoops 23 and 24 with its rectangular filtering faces in chordal disposition of the axis of rotation of the said hoops and, accordingly, a bracket 53 is provided on the hoop 23 to provide a seating for the edge of the leaf 40, whilst a bracket 54 is provided on the hoop 24 for the opposed edge of the said leaf. The leaf is held in position by means of bolts 55 saddled on the transverse bars 25, clamping members 56 being provided on each bolt 55 to put pressure upon the upper face of the filter leaf and so maintain the hydraulic connection of said leaf with the drainage tubes 41, the drainage orifices 52 having a spigot engagement within recesses 57 in the brackets 53, whilst the drainage tubes 41 have a union connection with the said drainage orifices 57.

The hoops 23 and 24 are maintained in their axially spaced relationship by means of the bars 25 and nuts 58 screwed on to the ends thereof, the brackets 53 being supported on the hoop 23 by means of bolts 59, passed through lugs 60, and nuts 61, the bracket 54 being mounted on the hoop 24 by means of bolts 62. As will be seen from Figure 10, the hoop 24 has a thickened inner periphery to provide a tread for the supporting roller 27.

As will be seen from Figures 11 and 12, each filter leaf, designated by the reference 40 in Figs. 7 to 10 inclusive, includes an envelope or bag 47 of suitable cloth, enveloping and supported by a framework consisting of a series of wooden battens 48 and metallic transverse members 49, the length of the leaf being coincident with the longitudinal space between the hoops 23, 24, and of a width slightly less than that between adjacent distance bars 25. Each transverse metallic member 49 is of channel form to accommodate the ends of the battens 48, an intermediate strengthening web 50 being interposed in each member 49 to maintain the battens 48 in spaced relationship. A metallic cloth or gauze 51 is adapted to support the fabric filtering medium 47.

As will be appreciated, in order to provide an unimpeded hydraulic communication of the filtering area with the drainage ports 52 of the leaf, the intermediate battens 48 are of shorter length than the end and central battens, whereby a channel is formed in the member 49 having the ports 52, the said channel being continued through the central batten by means of grooves formed in the upper and lower faces thereof, as will be seen in Fig. 12.

In order to prevent the filter cloth 47, of the several leaf structures, being disturbed by the scrapers 13, 14, and from being unduly distended when pressure is applied through the tubes 41, wires 63 extend across the inner and outer faces of each leaf and in close proximity to the filtering surfaces thereof. One form of wire clip for this purpose is illustrated in Figure 13, wherein a wire 63 of suitable thickness is bent at each end to form a clip for engagement with the spacing bars 25. Each end of the wire 63 may be arcuately bent back upon itself to form the necessary clip or may be repeatedly bent back upon itself, within the necessary arc, as indicated at Figure 14, to provide a spacing member axially of the bar 25.

As will be seen from the fragmentary perspective view of Figure 15, each filter leaf envelope 47 is provided with a series of the wires 63 extending across the inner and outer faces of the leaf, and it will be appreciated that when the series of filter leaves are in their chordal positions on the rotor the wires of adjacent leaves are arranged contiguously thereby preserving annular continuity of the rotor periphery and allowing no impedance to the rotation of said rotor by the action of the scrapers, 13, 14.

It will also be appreciated from Figure 15 that each filter leaf is held by the clamping members 56 at each of its four corners and that each bolt 55 and its clamping member 56 is adapted to maintain adjacent filter leaves in their positions on brackets 53, 54.

If desired, the casing 20 may completely shroud the rotor, in which event a door is provided between conveniently spaced members of the frame 29 to provide access to the interior of the rotor and, as will be readily appreciated, the interior faces of the filter leaves can be readily inspected due to the accessible nature of the open ended rotor.

It will be also appreciated that the constructional details of the apparatus may be modified to suit the nature of the liquor to be filtered as, for example, the present improvements are particularly applicable to a filtering apparatus for the separation of solid matter from slimes containing sugar juices and accordingly it may be found desirable to employ a filter medium of metallic cloth of fine mesh as distinct from a fabric material.

I declare that what I claim is:

1. Filter apparatus comprising, in combination, a tank for liquid to be filtered, a filter rotor in the form of a drum which is open at least at one end thereof and the filter area of the rotor being composed of the aggregation of the separate areas of a circumferential series of chordal filter leaves having inner and outer filtering surfaces providing both inner and outer faces of the drum, a series of separately formed wires disposed at spaced intervals over the entire inner and outer filtering areas of each leaf to prevent billowing and said wires being in contiguous relationship and in annular continuity around the drum both internally and externally thereof, means for rotating the drum while partially immersed in the liquid, means for passing the liquid from said tank through the filter area of said rotor and for withdrawing filtrate therefrom, and scraper means for removing residuum from both the inner and outer faces of the drum.

2. Filter apparatus comprising, in combination, a tank for liquid to be filtered, a filter rotor in the form of an open ended drum and the filter area of the rotor being composed of the aggregation of the separate areas of a circumferential series of chordal filter leaves having inner and outer filtering surfaces providing both inner and outer faces of the drum, a series of separately formed wires disposed at spaced intervals over the entire inner and outer filtering areas of each leaf to prevent billowing and said wires being in contiguous relationship and in annular continuity around the drum both internally and externally thereof, means for rotating the drum while partially immersed in the liquid, means for passing the liquid from said tank through the filter area of said rotor and for withdrawing filtrate therefrom, and scraper means for removing residuum from both the inner and outer faces of the drum.

3. Filter apparatus, as claimed in claim 1, wherein the filter rotor is in the form of a drum which at one end at least is open over a portion of its radial area.

4. Filter apparatus, as claimed in claim 1, wherein the filter rotor is in the form of a pair of open ended co-axial drums of similar diameter and having a common central web.

5. Filter apparatus, as claimed in claim 1, wherein the filter rotor is in the form of at least two co-axial open ended drums of dissimilar diameter and having a common web.

6. Filter apparatus, as claimed in claim 1, wherein the drum is immersed in the liquid to arcuate extent of approximately 90° or less, and wherein the scraper means consists of an inner scraper disposed adjacent the inside surface of the drum and an outer scraper disposed adjacent the outside surface of the drum for removing residuum from the inner and outer faces of said drum.

7. Filter apparatus, as claimed in claim 1, wherein the drum is composed of a skeleton framework including a pair of axially spaced hoops with the filter leaves arranged between the axially spaced hoops and in circumferential relationship to the axis of rotation of the rotor.

8. Filter apparatus, as claimed in claim 2, wherein the drum comprises a skeleton framework including a pair of axially spaced hoops and brackets carried by said hoops, and on which the filter leaves are seated in spaced relationship from the axis of the rotor between said axially spaced hoops and with the brackets of one hoop providing hydraulic communication between the filter leaves and drainage pipes for the filtrate.

9. Filter apparatus, as claimed in claim 2, wherein the drum consists of a skeleton framework comprising a pair of hoops and spacing members for maintaining the hoops in axially spaced relationship with the filtering leaves arranged therebetween and spaced radially from the axis of the drum, and wherein the said series of separate and contiguous wires in the form of clips are arranged between adjacent spacing members and are disposed adjacent the filtering leaves in annular continuity around each of the filter areas for holding the leaves down on the supports whereby to prevent billowing when back pressure is applied.

EDWARD WALTER WOLFE KEENE.